(12) United States Patent
Richmond et al.

(10) Patent No.: US 8,806,224 B2
(45) Date of Patent: Aug. 12, 2014

(54) LOW COST TRUSTED PLATFORM

(75) Inventors: Michael S. Richmond, Beaverton, OR (US); Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 2445 days.

(21) Appl. No.: 11/170,597

(22) Filed: Jun. 28, 2005

(65) Prior Publication Data

US 2007/0016766 A1    Jan. 18, 2007

(51) Int. Cl.
*G06F 21/00* (2013.01)
(52) U.S. Cl.
USPC ............................................ 713/193; 726/34
(58) Field of Classification Search
USPC ........ 713/193, 194, 1, 2, 192; 726/16–19, 34, 726/26
See application file for complete search history.

(56) References Cited

U.S. PATENT DOCUMENTS

| | | | |
|---|---|---|---|
| 6,848,046 B2 | 1/2005 | Zimmer | |
| 7,496,966 B1 * | 2/2009 | McGrath et al. | 726/27 |
| 2003/0115453 A1 * | 6/2003 | Grawrock | 713/155 |
| 2004/0103299 A1 * | 5/2004 | Zimmer et al. | 713/200 |
| 2005/0039013 A1 | 2/2005 | Bajikar et al. | |
| 2005/0081065 A1 | 4/2005 | Brickell et al. | |
| 2006/0020781 A1 | 1/2006 | Scarlata et al. | |

OTHER PUBLICATIONS

Zimmer, U.S. Appl. No. 10/268,855, filed Oct. 9, 2002.
TPM v1.2 Specification Changes, Trusted Computing Group, Oct. 2003, 14 pages; link: https://www.trustedcomputinggroup.org.
Trusted Platform Modules Strengthen User and Platform Authenticity, a whitepaper, Trusted Computing Group, Jan. 2005, 8 pages; link: https://www.trustedcomputinggroup.org/downloads/whitepapers.

* cited by examiner

*Primary Examiner* — Edward Zee
(74) *Attorney, Agent, or Firm* — Blakely, Sokoloff, Taylor & Zafman LLP

(57) ABSTRACT

A method and apparatus is described herein for emulating a physical trusted platform module (TPM) in a virtual monitor, such as a system management mode (SMM) or a system management interrupt (SMI) transfer monitor (STM). By allowing SMIs during a secure launch, SMM is allowed into the secure launch trust perimeter and a virtual monitor may emulate the structures, behaviors, and protected storage of a physical TMP, such as the storage of cryptographic keys, secure verification, attestation, and other TPM functions.

18 Claims, 10 Drawing Sheets

LOW COST TRUSTED PLATFORM

FIELD

This invention relates to the field of computer systems, and in particular to emulation of security components.

BACKGROUND

A conventional processing system, such as system 100 shown in FIG. 1*a*, may include hardware resources, such as microprocessor 105 and system memory 115, as well as software resources, such as an operating system (OS) and one or more end-user programs or applications. When booting a computer system, the OS is usually loaded before any of the end-user programs or applications and serves as an intermediary between the software applications and hardware in the computer system.

In addition to system memory and one or more microprocessors, a processing system may currently, also include trusted platform module (TPM) 120. A TPM is a hardware component that resides within a processing system and provides various facilities and services for enhancing the security of the processing system. For example, a TPM may be used to protect data and to attest to the configuration of a platform. The sub-components of a TPM may include an execution engine and secure non-volatile (NV) memory or storage. The secure NV memory is used to store sensitive information, such as encryption keys, and the execution engine protects the sensitive information according to the security policies to be implemented by the TPM.

A TPM may be implemented in accordance with specifications such as the Trusted Computing Group (TCG) TPM Specification Version 1.2, dated Oct. 2, 2003 (hereinafter the "TPM specification"), which includes parts such as Design Principles, Structures of the TPM, and TPM Commands. The TPM specification is published by the TCG and is available from the Internet at the trusted computing group website (trustedcomputinggroup(dot)org.

In general a TCG-compliant TPM provides security services such as attesting to the identity and/or integrity of the platform, based on characteristics of the platform. The platform characteristics typically considered by a TPM include hardware components of the platform, such as the processor(s) and chipset, as well as the software residing in the platform, such as the firmware and OS. A TPM may also support auditing and logging of software processes, as well as verification of platform boot integrity, file integrity, and software licensing. It may therefore be said that a TPM provides a root of trust for a platform. Accordingly, a third party may implement security policies which require requesting systems to provide TPM-based platform attestation. For instance, the third party may configure a server to deny client requests unless those requests are accompanied by valid, TPM-based platform attestation from the client systems.

However, including the TPM as a separate hardware component on every platform is potentially expensive. As the demand for more inexpensive platforms and computers continues to grow, elimination of component cost within a system, such as the cost of including a separate TPM component in every system, becomes an ever-growing consideration.

Turning to FIG. 1*b*, an example of a current secure launch timeline 140 within a computer system, such as system 100 illustrated in FIG. 1*a*, is shown. Usually, some secure initialization instruction, such as a secure-enter (SENTER) instruction 160 is issued. Typically, after issuance of SENTER 160, system management interrupts (SMIs) 168 are blocked, as it is unknown if a system management mode (SMM) used to handle SMIs 168 may be trusted at that time. Although this potentially ensures high trust level, it comes at the price of an extra component within the platform, where a potentially lower level based trust may be sufficient.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as specific trusted platform module components, emulation techniques, virtual monitors, cryptographic keys, and system configurations in order to provide a thorough understanding of the present invention. It will be apparent, however, to one skilled in the art that these specific details need not be employed to practice the present invention. In other instances, well known components or methods, such well-known system management, virtualization, interrupt handling, and BIOS/EFI implementations have not been described in detail in order to avoid unnecessarily obscuring the present invention.

Allowing SMIs During Secure Launch

Figure 1A:
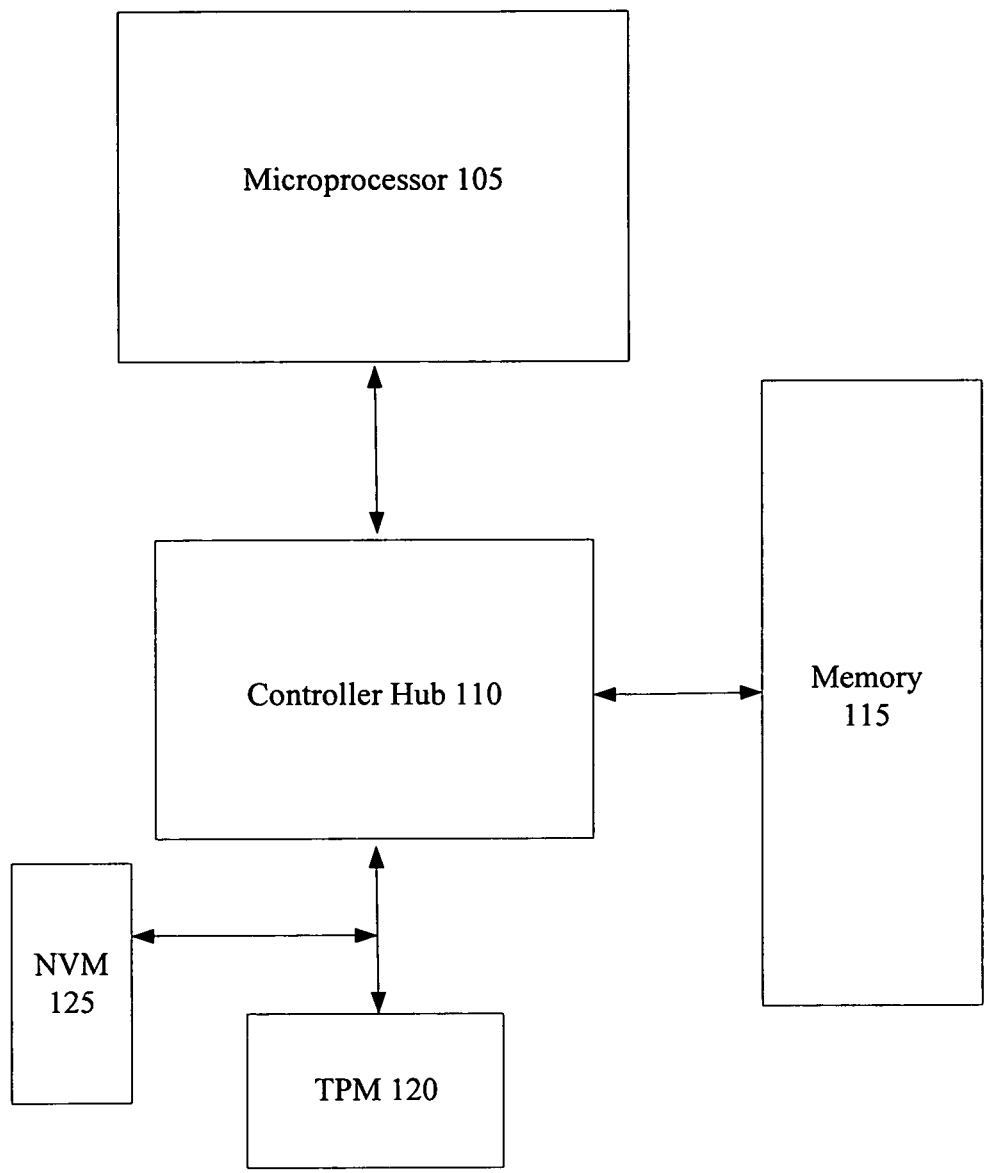
FIG. 1*a* illustrates a prior art system having a physical hardware TPM component.
Figure 1B:
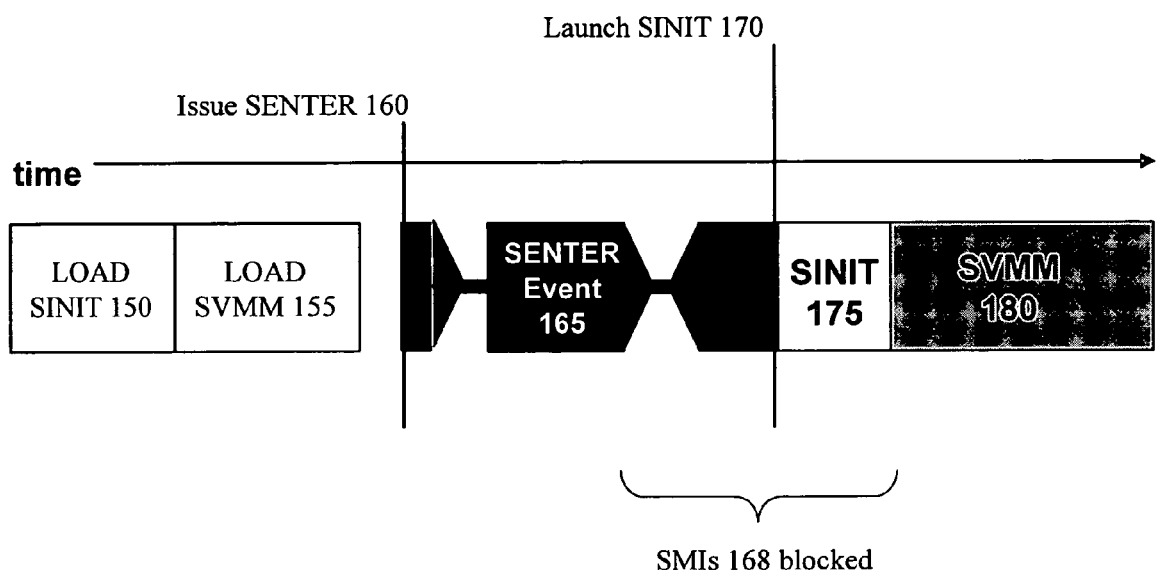
FIG. 1*b* illustrates a prior art secure launch timeline, which blocks SMIs.
Figure 2:
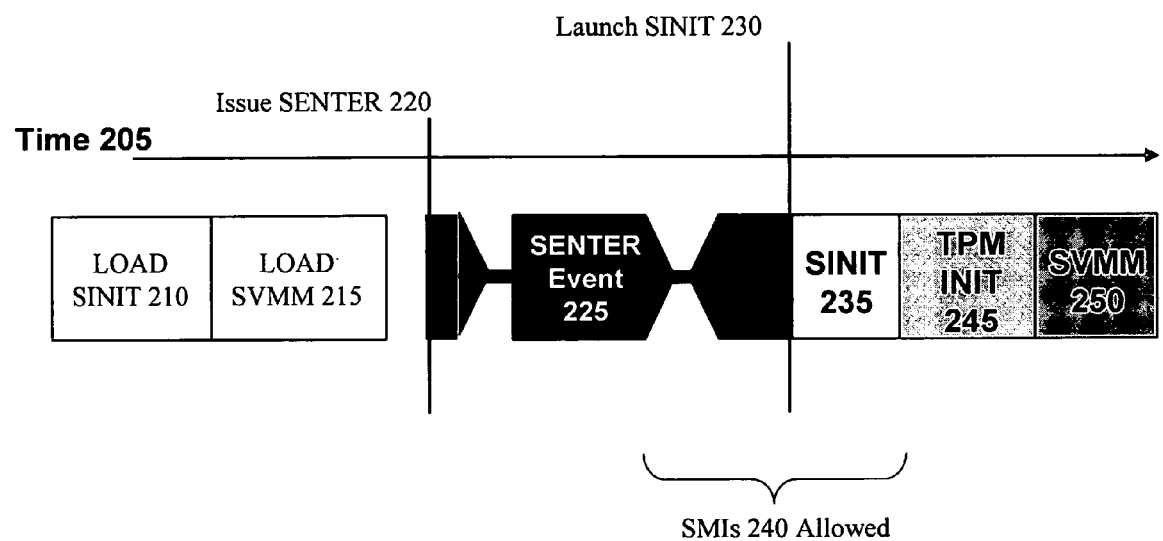
FIG. 2 illustrates an embodiment of a secure launch timeline that allows SMIs.

FIG. 2 illustrates an embodiment of a secure launch timeline, i.e. timeline 200. Much like FIG. 1*a*, a secure-enter (SENTER) instruction 220 is issued. A specific embodiment of an instruction, SENTER, is illustrated, which is an instruction to initiate a launch on Intel Corporation microprocessors, which implement LaGrande Technology. An architectural overview of LaGrande Technology may be found on Intel's website (intel(dot)com/technology/security/downloads/lt_arch_overview.pdf). Specifically, SENTER triggers a sequence of hand-shakes, where a processor loads authenticated code into memory, authenticates it, registers its identity, and then invokes it. Any secure initialization instruction or other instruction to initiate a secure launch may be used.

As compared to FIG. 1*a* where system management interrupts (SMIs) were blocked during secure launch, SMIs 240 are now allowed. The blocking of SMIs during secure launch was previously based on the assumption that a virtual monitor, such as a system management mode (SMM), could not be trusted at that time. Blocking of SMIs at this time potentially results in a high level of root trust when verifying a platform's configuration or code. However, by including a virtual monitor, such as SMM, into the trust perimeter of a secure launch, a trusted platform module (TPM) may be emulated in SMM, which potentially eliminates the need of a physically separate TPM component, as discussed below. As illustrated in block 245 a TPM emulator is initialized in the virtual monitor based on allowing SMIs during secure launch. The TPM emulator and initialization of the TPM emulator will be discussed in more detail below.

A Stand-Alone TPM Emulator

Figure 3:
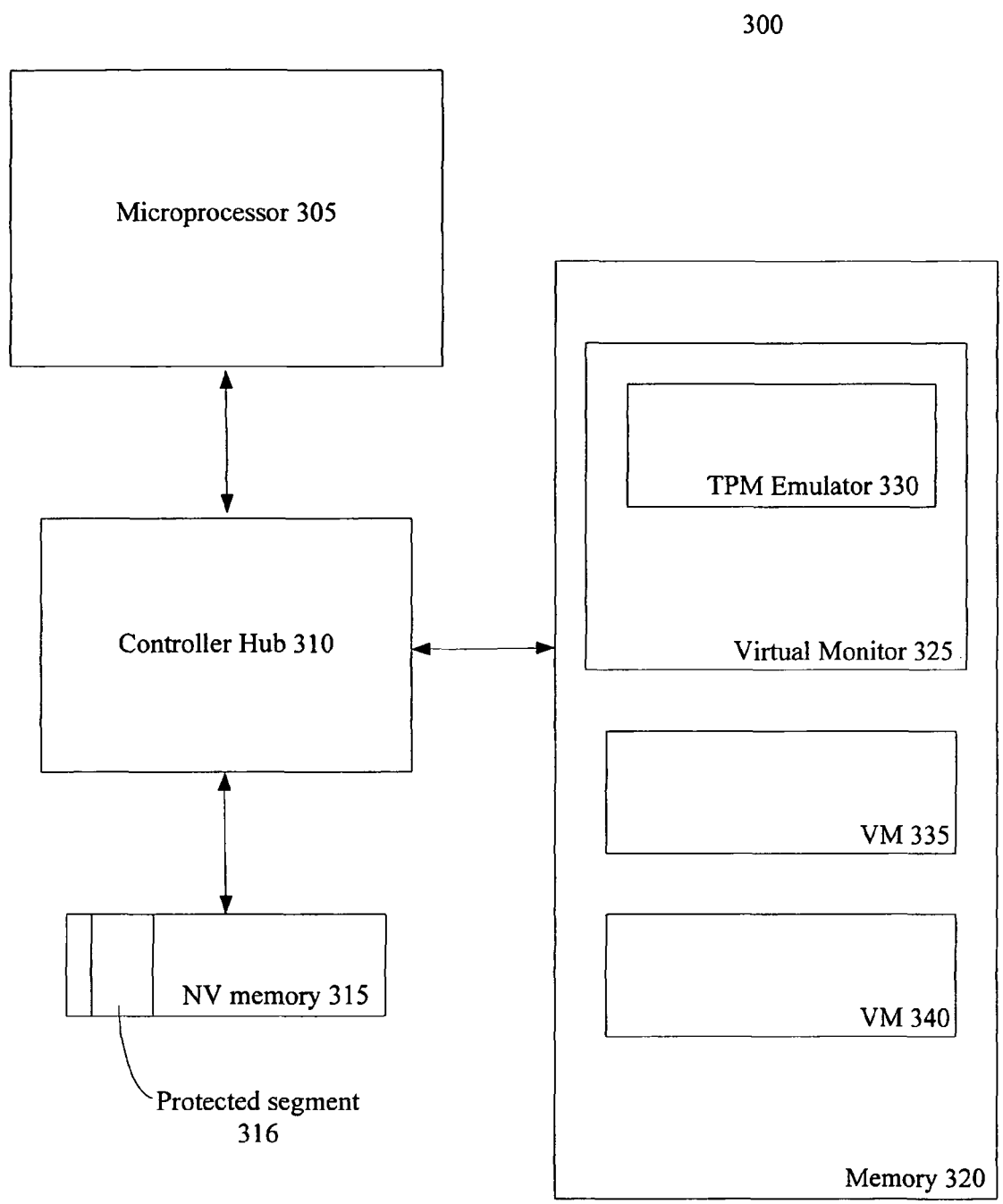
FIG. 3 illustrates an embodiment of a system including a stand-alone trusted platform module (TPM) emulator.

Turning to FIG. 3 an embodiment of a system including a stand-alone trusted platform module (TPM) emulator is illustrated. A TPM emulator comprises code to emulate a TPM. A TPM emulator may further comprise nonvolatile memory storage, such as nonvolatile memory 315 to store static, dynamic, and/or cryptographic information. A TPM emulator may include other hardware, software, firmware, or combination thereof.

A TPM emulator that "stands-alone" includes a TPM emulator in a system, such as system 300, without a physically separate trusted platform module (TPM) hardware device/component. In one embodiment, a stand-alone TPM emulator includes a TPM emulator driver/handler to be loaded in a protected range of system memory 320. In this embodiment, system 300 does not include a physical TPM; however, nonvolatile memory, such as nonvolatile memory 315, which is used to store boot code may also be used to store protected information to be used in TPM emulation.

Although a stand-alone TPM emulator does not include a physical TPM component, a plurality of emulated TPMs may be implemented. For example, an application having Ser. No. 10/876,994 and entitled, "Method and Apparatus for Providing Secure Virtualization of a Trusted Platform Module," describes emulation of a TPM for each virtual machine running in a platform, where each "virtual TPM" is based off a single physical TPM device. Consequently, a plurality of "virtual TPMs" may be emulated for a plurality of virtual machines running in a platform based off a stand-alone TPM emulator, rather than a physical device.

Nonvolatile Memory

Nonvolatile (NV) memory 315 may include any type of nonvolatile memory, such as FLASH memory. Examples of FLASH include electrically erasable programmable read only memory (EEPROM), as well as other read-only memory (ROM) devices. In one embodiment, NV memory 315 is used to store boot code. As an example, NV memory and the boot code are part of an extensible firmware interface (EFI) framework. EFI is a firmware implementation that performs a full range of operations to initialize a platform from power on through transfer of control of the platform to an operating system (OS). More information and specific implementation details on EFI may be found on Intel's website at intel(dot)com/technology/framework. In legacy systems, the boot code stored in FLASH is often referred to as basic input/output software (BIOS). NV memory 315 may store either BIOS or EFI code, as well as other boot code and data.

As stated above, a virtual monitor mode, such as a system management mode (SMM), is currently not trusted during secure launch. However, by allowing SMIs to be generated and handled during secure launch, i.e. letting a virtual monitor mode, such as SMM, into the trust perimeter, a TPM may be emulated in software. Consequently, instead of utilizing a separate physical TPM, a TPM driver/emulator may be certified during secure launch. By utilizing the same storage area used for storing boot code, trusting the firmware/BIOS may be sufficient in ensuring a root trust for the rest of the system.

Upon loss of power to the system or reboot, information typically stored in protected memory of a physically separate TPM, may be stored in NV memory 315. In one embodiment NV memory 315 includes a protected segment/secure portion 316 to store cryptographic information. Cryptographic information may include any information, behaviors, and/or any structures commonly stored or associated with a physical TPM. Examples of cryptographic information include a platform configuration value, a private key, a public key, an endorsement key, an attestation identity key (AIK), a storage root key, an encryption key, a signing key, and an endorsement credential key. Other information commonly stored in a physical TPM may be found in the TPM specification, which is published by the Trusted Computing Group (TCG) and is available from the Internet at trustedcomputinggroup(dot)org/home.

Virtual Monitor

Also illustrated in FIG. 3 is system memory 320 coupled to controller hub 310. System memory 320 includes any access memory, such as a random access memory (RAM). Controller hub 310 includes any hub or logic for interfacing between components, such as a memory controller hub, an interconnect controller hub, or the combination thereof, which is commonly referred to as a chipset.

During operation of system 300, a virtual monitor is typically assigned a protected range of memory, as illustrated in FIG. 3 with virtual monitor 325. However, protected memory may be located anywhere in system 300, including outside system memory 320. A virtual monitor includes any operation mode of a processor and/or management program for detecting and or handling system events, such as system management interrupts, commands, or ordinals.

System Management Mode (SMM)

In one embodiment a virtual monitor includes a system management mode (SMM). SMM is a special-purpose operating mode provided for handling system-wide functions like power management, system hardware control, or proprietary OEM-designed code. The mode is typically deemed "hidden" because the operating system (OS) and software applications cannot see it, or access it. SMM is usually activated through a system or processor management interrupt (SMI or PMI). Therefore, as stated above, during a secure launch SMIs are allowed, so SMM may be initialized.

SMM is typically associated with a protected range of memory, such as the range illustrated for virtual monitor 325, which is often referred to as SMRAM. Access to this portion of memory is typically protected from access by controller hub 310, as controller hub 310 ensures that only the correct user level priority may access the protected range of memory. An infrastructure for SMM relating to an EFI framework is described in more detail in U.S. Pat. No. 6,848,046 "SMM loader and execution mechanism for component software for multiple architectures."

As a result, SMM has many advantageous attributes that may be used in emulation of a TPM, such as a separate system management execution mode and isolated protected storage. Additionally, SMM includes a number of event handlers to provide service routines for a system. An SMM event handler usually comprises a set of code that, when executed by a processor, performs an event service function in a manner similar to an interrupt service routine. The use of SMM as a virtual monitor is discussed in more detail in the STAND-ALONE TPM EMULATOR CODE section.

SMI transfer Monitor (STM)

In another embodiment, a virtual monitor is a SMI transfer monitor (STM). STM is a peer monitor that works with both the VMX (Virtual Machine Extensions) and SMX (Secure Machine Extensions). VMX refers to platform virtualization within Intel microprocessors, while SMX refers to platform security in Intel microprocessor through the use of LaGrande Technology. More information may be found on Virtualization and LaGrande Technology at the following websites, respectively: intel(dot)com/technology/computing/vptech/ and intel(dot)com/technology/security/.

An STM has many of the same advantages as described above in reference to SMM. Additionally, in a platform implementing both VMX and SMX, the STM typically has a coequal privilege with the main monitor in a multi-virtual machine environment. Consequently, a TPM may be emulated in the STM, allowing a coequal privilege access level to hardware, ensuring an adequate root trust level.

Virtual Machine Monitor

In yet another embodiment, a virtual monitor may be a virtual machine monitor (VMM). VMM is a monitor for interfacing a plurality of virtual machines on a platform with hardware. Therefore, in specific implementations where a lower security level is required, a stand-alone TPM emulator code may be present in protected memory associated with a VMM.

Stand-Alone TPM Emulator Code

Within the range of memory 325, stand-alone TPM emulator code 330 is illustrated to emulate a TPM. In one embodiment, TPM emulator 330 is a SMM event handler to handle commands or ordinals issued to a TPM memory space. Here, an ordinal or command is issued, which references a memory space associated with the TPM. Upon detecting the command or ordinal, the TPM emulator 330 handles the command or ordinal, instead of the ordinal being handled by a physical TPM.

In another embodiment, stand-alone TPM emulator code includes code to emulate behaviors of a physical TPM, as well as performing cryptographic operations, such as handling of commands and ordinals by a physical TPM. TPM emulator code may be present in memory associated with either SMM or STM.

Examples of behaviors of a physical TPM include strong user authentication and device validation, protected storage of secrets, platform attestation, secure access, and secure hash comparison, as well as many other functions. Examples of cryptographic operations include data protection, hashing, sealing an internally generate asymmetric key pair to a particular computing platform, signing information with a private key, and signing information with a public key.

The specification of a physical TPM, as well as other examples of a physical TPM's behaviors and cryptographic operations may be found at TCG's website: trustedcomputinggroup(dot)org/home.

The following is an illustrative example of emulating a cryptographic operation commonly associated with a physical TPM. Using a physical TPM, to ensure unauthorized changes to a platform's configuration do not occur, a method of attestation is used. Attestation includes a hash algorithm to calculate a first hash value from information stored in platform configuration registers (PCRs), when the platform is setup. Upon re-boot, a new hash value is calculated and compared against the original. If the values match, it is determined that the platform configurations match. In a physical TPM, as described in the current specification, the hash algorithm is a SHA-1 algorithm, access to the PCRs require trusted authorization, and the hash values are stored with the TPMs secure non-volatile memory.

Using a stand-alone TPM emulator, the hash algorithm used in code may still be a SHA-1 algorithm. The hash values of both the initial setup and the current platform configuration may be stored in either the protected range of memory associated with the virtual monitor or in the protected segment of NV memory 315. As an example, the PCR value for the initial setup is stored in a locked portion of NV memory 315. Consequently, the same security of a physical TPM may be implemented in a stand-alone TPM emulator in a system without a physical TPM.

Issuing a TPM Ordinal

Also illustrated in FIG. 3 is microprocessor 305, which is coupled to controller hub 310. Microprocessor 305 may be any processing element capable of operation in a management mode or execution of a virtual monitor. As a processing element, microprocessor 305 may be capable of parallel out-of-order speculative execution, as well as serial in-order execution.

Microprocessor 305, just as with a physical TPM, may issue an ordinal or command to an address space associated with the TPM. Where a stand-alone emulator is used, it is determined when a command to the TPM address space is issued, and the command is emulated in software, rather than handled by a physical TPM. In one embodiment, a TPM ordinal referencing a range of memory associated with the stand-alone TPM emulator code is issued. The TPM ordinal is handled and serviced in the TPM emulator, rather than a physically separate TPM device.

Lastly, FIG. 3 illustrates virtual machines (VMs) 335 and 340 in memory 320. As discussed above, virtualization allows multiple operating systems and applications to run independently, each able to access a dedicated region of memory, such as VM 335 and VM 340. Also stated above, VM 335 and VM 340 may each have an emulated virtual TPM, as disclosed in Ser. No. 10/876,994, "Method and Apparatus for Providing Secure Virtualization of a Trusted Platform Module."

An Embodiment of Layering for a Virtual Machine Platform

Figure 4:
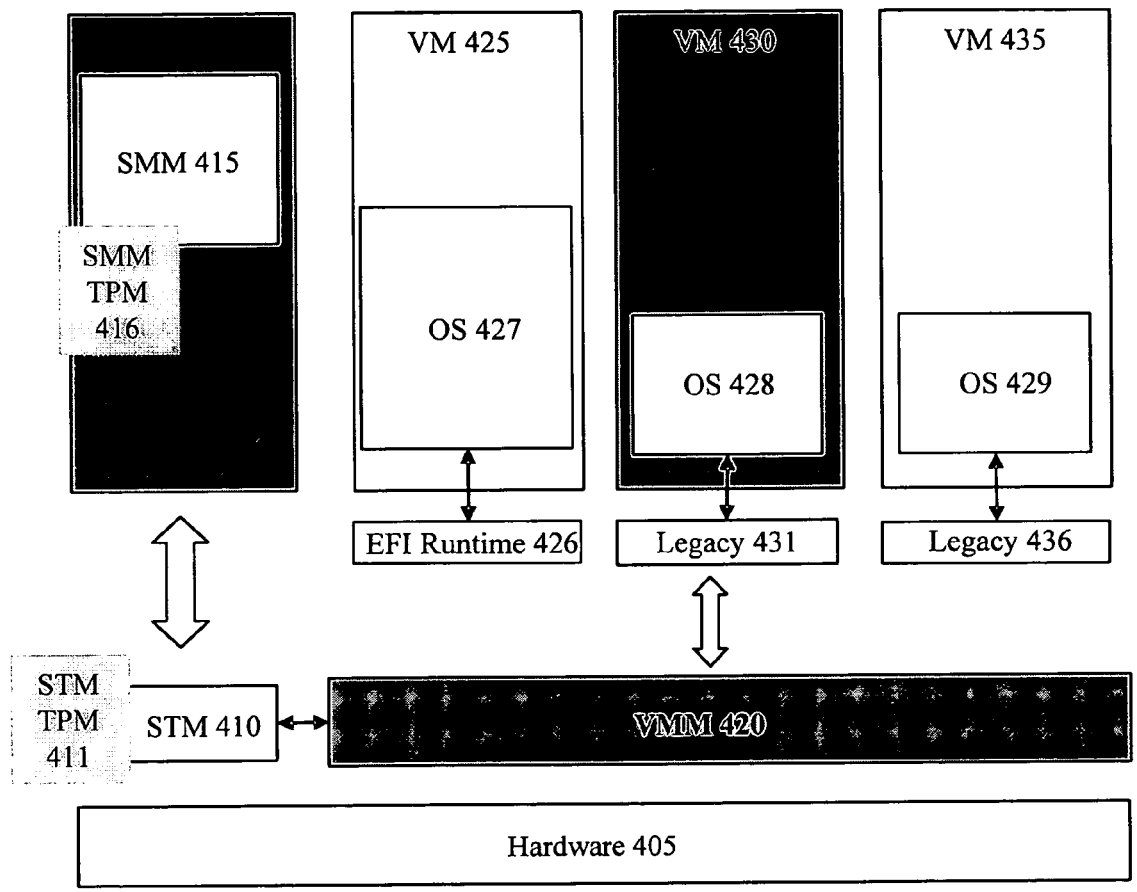
FIG. 4 illustrates an embodiment of a layered view of a system including a plurality of virtual machines and a SMI transfer monitor (STM).

Turning to FIG. 4, an embodiment of the layering for a virtual machine platform is illustrated. At the most basic level hardware 405 is illustrated. Hardware 405 may include a processor, controller hubs, system memory, network devices, and other hardware in a computer system.

SMM 415 is for handling system management interrupts based on system events, both hardware and software generated. In one embodiment, a TPM is emulated as SMM TPM 416. Commonly, an SMI is received an SMM determines the correct handler to service the event. Here, an SMI generated from a secure initialization instruction, such as SENTER, may be handled as to initialize SMM TPM 416. Additionally, when a TPM command or ordinal is issued, it may be emulated in the SMM space.

Alternatively, in a system implementing STM 410 to interface with VMM 420 and SMM 415, a stand-alone TPM emulator may be present in STM 410. VMM 420 is to interface with a plurality of virtual machines in accordance with virtualization. In the case where an STM 410 is present, it has a privilege level high enough to interface with the SMM and VMM, allowing STM 410 to access protected memory and ensure trust.

Embodiments of Initializing a Stand-Alone TPM Emulator

Figure 5A:
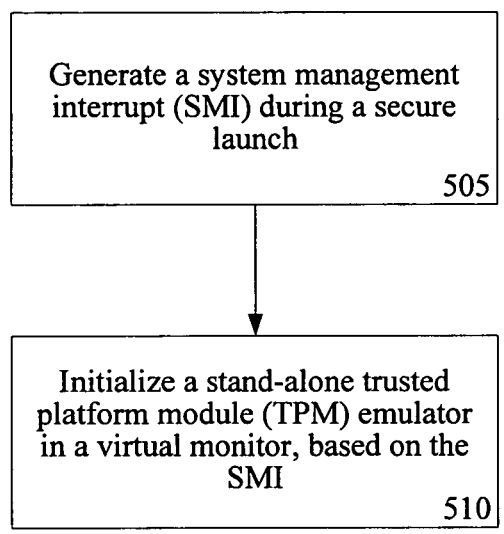
FIG. 5*a* illustrates an embodiment of flow diagram for initializing a TPM emulator in a virtual monitor.

Turning to FIG. 5a, an embodiment of a flow diagram for emulating a TPM is illustrated. In flow 505, a system management interrupt (SMI) is generated during a secure launch.

Previously, SMIs were blocked during a secure launch. However, by allowing the SMI to be generated in flow 505, a stand-alone trusted platform module (TPM) emulator may be initialized in a virtual monitor, based on the SMI in flow 510.

As stated above, a virtual monitor includes any operation mode of a processor and/or management program for detecting and or handling system events, such as system management interrupts, commands, or ordinals. Examples of virtual monitors include system management mode (SMM), SMI transfer monitor (STM), and virtual machine monitor (VMM).

In one embodiment, initializing a stand-alone TPM emulator in a virtual machine includes loading a TPM emulator driver in at least a portion of protected memory associated with the virtual monitor. As a specific example, a TPM emulator driver is registered in the protected memory space, i.e. SMRAM, associated with SMM.

Figure 5B:
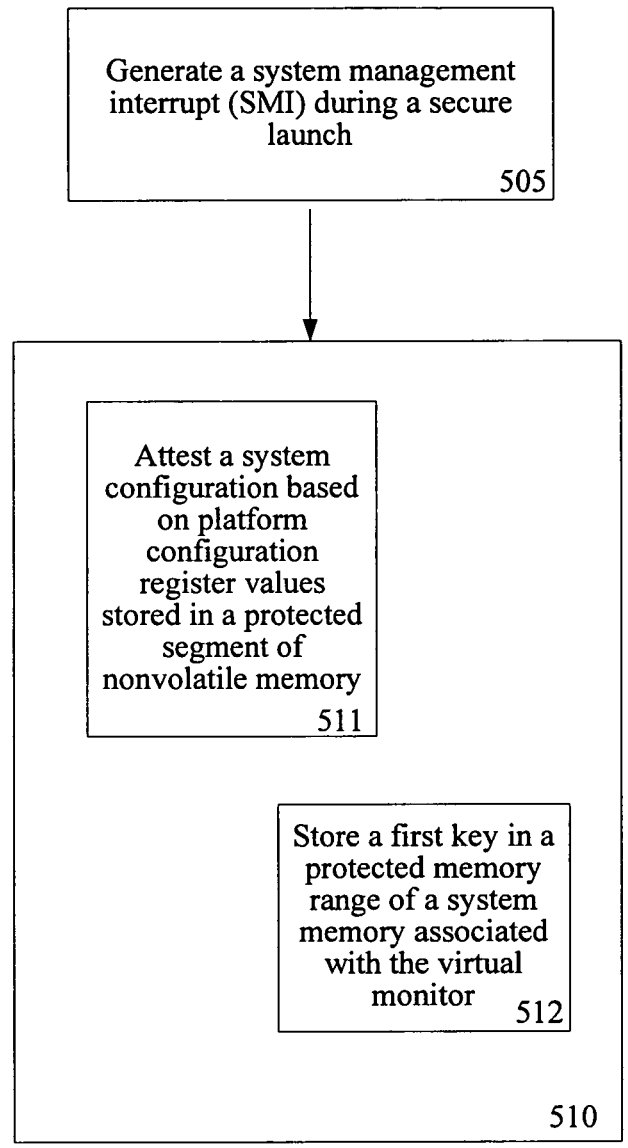
FIG. 5*b* illustrates an embodiment of the flow shown in FIG. 5*a*.

Referring to FIG. 5b, another example of initializing a stand-alone TPM emulator is illustrated. A system configuration, identity, or integrity is attested based on platform configuration register (PCR) values stored in a protected segment of nonvolatile (NV) memory. Previously, PCRs were located within the physical TPM hardware component. Based on a previous setup/configuration of the platform, including hardware components, firmware, and software residing in the system a hash value was created and stored in the physical TPM.

Similarly, the hash value may be created and stored in a protected segment of NV memory, which is also used to store boot code. As an example, the NV memory and boot code are part of an extensible firmware interface (EFI) framework. The stored hash value based on a previous system configuration is stored in protected memory from a reasonably trustworthy source, the boot software storage. The PCR values from the previous setup, which may be in a hash value format, are compared with a current hash value based on the current setup to ensure the platform integrity, identity, and/or configuration.

In another embodiment, initializing a stand-alone TPM emulator includes storing a first key in a protected memory range associated with the virtual monitor. Often both public and private keys are used in signing, verification, and other cryptographic operations. Therefore, keys, such as an endorsement key, an attestation identity key (AIK), a storage root key, an encryption key, a signing key, and an endorsement credential key may be loaded from NV memory and stored, as well as generated through cryptographic operations and stored.

Figure 5C:
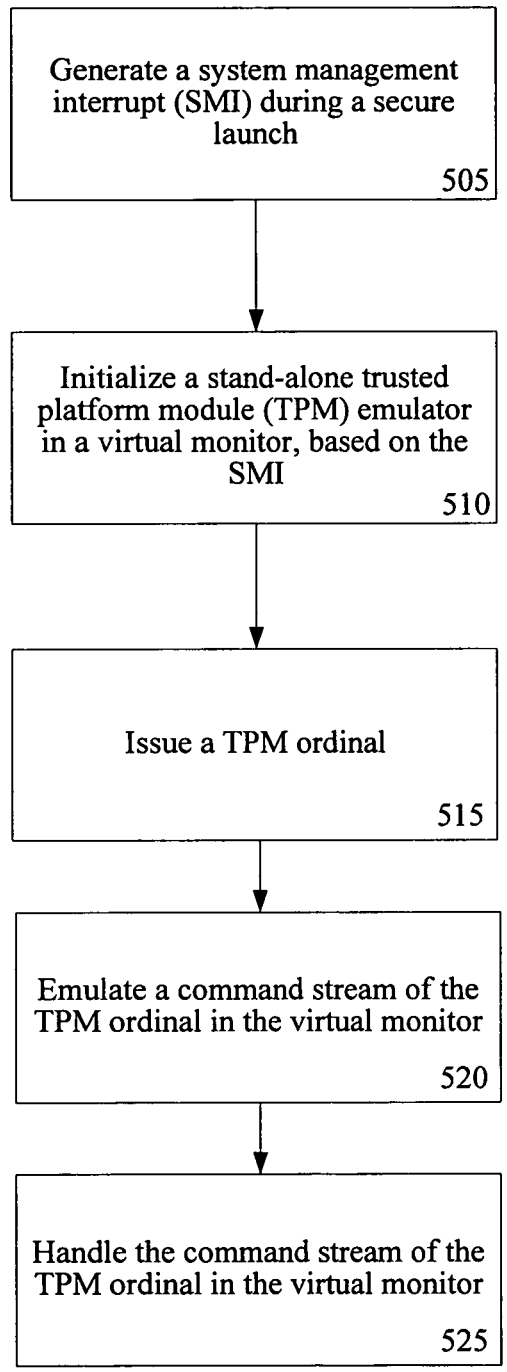
FIG. 5*c* illustrates another embodiment of the flow shown in FIG. 5*a*, where a TPM ordinal is issued, emulated, and handled.

Furthermore, turning to FIG. 5c an embodiment of additional operation of a stand-alone TPM emulator is illustrated. In flow 515, a TPM ordinal is issued. The TPM ordinal or command stream references an address or address space associated with a TPM. In a first example, the address space is associated with a physical TPM device. However, upon determining that a command referencing an address space associated with a physical TPM device is issued, the TPM command stream is emulated in the virtual monitor and handled by the stand-alone TPM emulator in the virtual monitor.

An Embodiment of a Secure Launch

Figure 6:
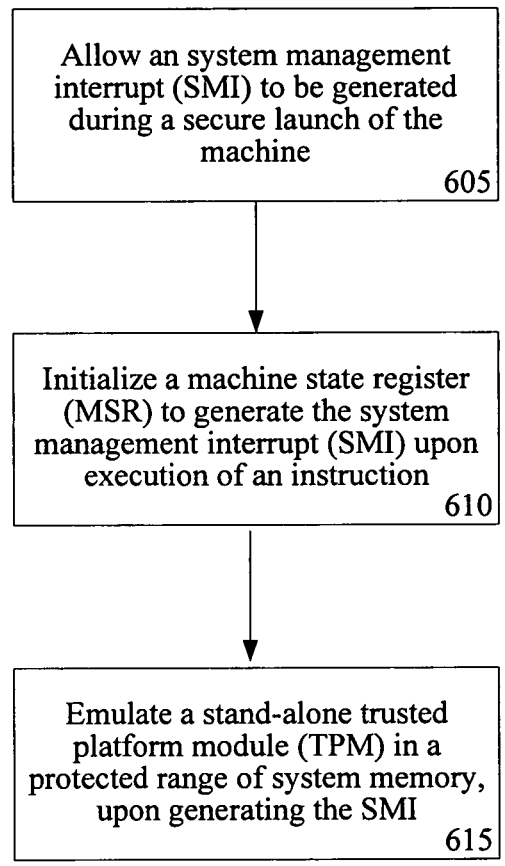
FIG. 6 illustrates an embodiment of a flow for allowing SMIs to be generated during a secure launch.

Turning to FIG. 6 an embodiment of a flow for allowing emulation of a TPM during secure launch is illustrated. In flow 605, SMIs are allowed during a secure launch. In flow 610, a machine state register (MSR) is initialized to generation a SMI upon execution of an instruction, such as a secure initialization (SINIT) or SENTER instruction. In flow 615, a stand alone TPM is emulated in a protected range of system memory, based on the SMI. The TPM code used to emulate a physical TPM may be contained within a range of memory associated with a virtual monitor or protected range of memory, as well as partially overlapping.

Emulation of a TPM in protected memory includes servicing a TPM ordinal or command through use of hardware, firmware, software code, or any combination thereof without using a physical TPM device. Servicing a TPM ordinal or command may be done by emulating any structure commonly implemented or associated with a physical TPM device, such as a user key hierarchy, a platform configuration register (PCR), a monotonic counter, a data integrity register, an endorsement key, an attestation identity key (AIK), a storage root key, an encryption key, a signing key, and an endorsement credential key. Other structures commonly associated with a physical TPM device may be found at TCG's website: trustedcomputinggroup(dot)org/home.

An Embodiment of Booting and Running a System Including a TPM Emulator

Figure 7:
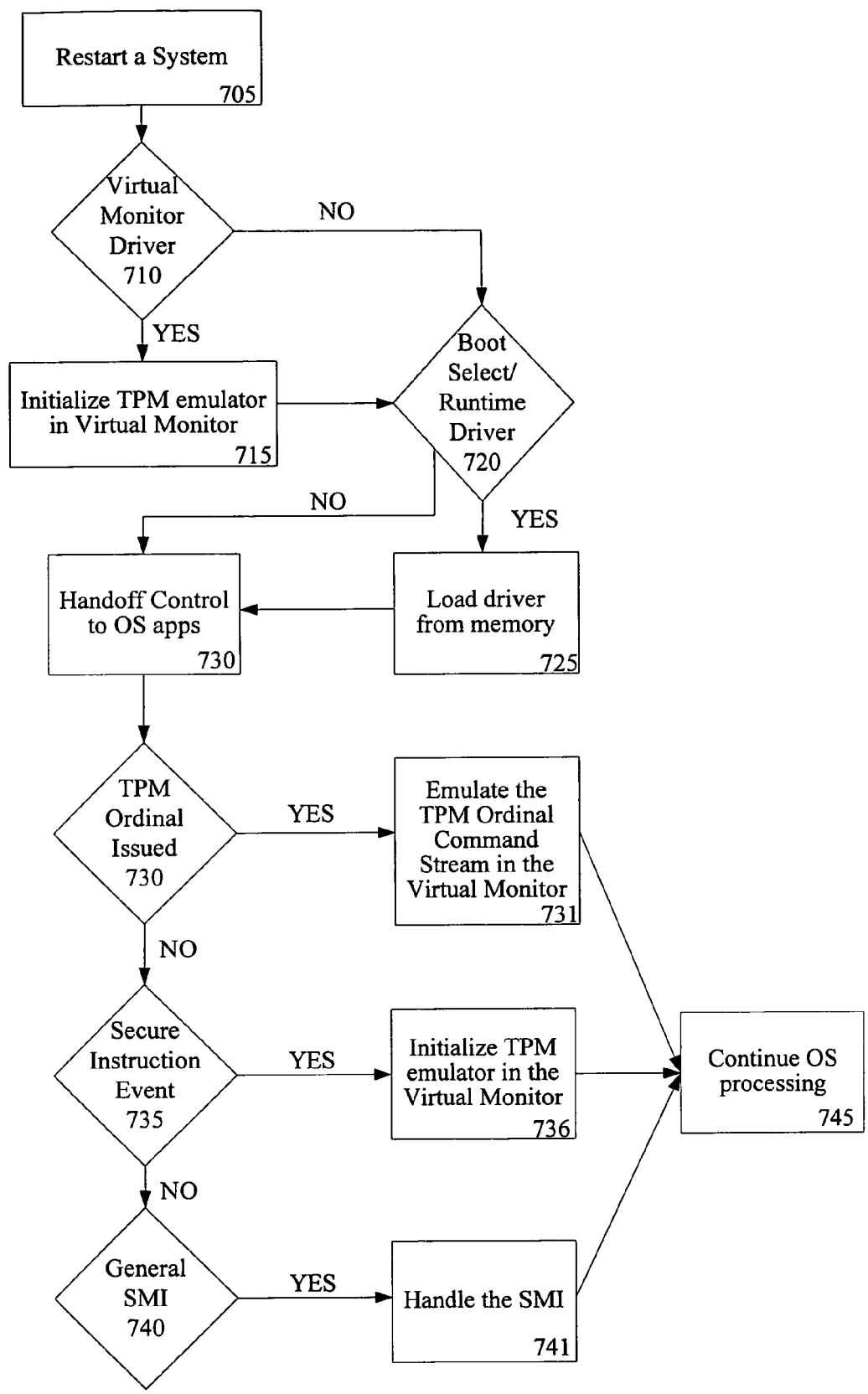
FIG. 7 illustrates an embodiment of a flow for starting a system with stand-alone TPM emulator.

FIG. 7 illustrates a specific embodiment of a flow diagram using a stand-alone TPM emulator. A system is restarted in 705. Typically, between restart of a system and handoff of control to operating system (OS) code, boot software is executed, which may include BIOS or EFI code, as stated above. If a virtual monitor driver is present, then a TPM emulator is initialized in the virtual monitor in flow 715. This may include setting a machine state register (MSR) to generate an SMI on a secure instruction event, such as an SENTER event. The virtual monitor being a system management mode or SMI transfer monitor. Additionally, if a boot select/runtime driver is present, as shown in decision flow 720, then the driver is loaded from memory in flow 725. A boot/select runtime driver may be any driver or boot software loaded or executed, such as current boot software.

After the boot process is complete, control is handed off to one or a plurality of operating systems and applications in flow 730. If a TPM ordinal is issued in decision flow 730, then the TPM ordinal command stream is emulated in the virtual monitor in flow 731. After handling/servicing the command stream control is handed back to the OS for processing in flow 745.

Alternatively, if a secure instruction event, such as an SENTER event, occurs, as in flow 735, the TPM is initialized/emulated in the virtual monitor, as illustrated in flow 736. Emulation may include hash extending the SVMM into protected memory associated with the virtual monitor, such as SMRAM, as well as emulation of TPM structures such as PCRs.

Finally, if a general SMI is generated, as in flow 740, the SMI is handled by the virtual monitor, such as SMM. SMM may handle the general SMI as an general SMI is currently handled. After servicing, the OS continues processing in flow 745.

As can be seen from above, by allowing SMM into the trust perimeter during secure launch a physical TPM device is emulated in a virtual monitor, such as SMM or STM. By allowing SMM into the trust perimeter, security/trust may still be reasonably ensured by protected NV memory and the use of the operational modes of a processor and isolated protected storage associated with the virtual monitors. This allows the physical TPM to be removed from the system potentially saving a large amount of money in the manufacture of a platform, which inevitably allows for competition of platforms in lower price segments.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
generating a system management interrupt (SMI) during a secure launch of a computer system; and
initializing, in response to the SMI, a stand-alone trusted platform module (TPM) emulator, which is to include at least one protected secret, in a virtual monitor during the secure launch;
issuing a TPM ordinal;
emulating a command stream of the TPM ordinal in the virtual monitor; and
handling the command stream of the TPM ordinal in the virtual monitor.

2. The method of claim 1, wherein the virtual monitor is selected from a group consisting of a system management monitor (SMM), a SMI transfer monitor (STM), and a virtual machine monitor (VMM).

3. The method of claim 1, wherein initializing the stand-alone TPM emulator in the virtual monitor comprises:
attesting a system configuration based on platform configuration register values stored in a protected segment of a nonvolatile memory, the nonvolatile memory also to store boot-software.

4. The method of claim 3, wherein initializing the stand-alone TPM emulator in the virtual monitor further comprises
storing a first key in a protected memory range of a system memory associated with the virtual monitor;
generating a second key; and
storing the second key in the protected memory range associated with the virtual monitor.

5. The method of claim 4 wherein each of the first and the second keys is selected from a group consisting of a public key, a private key, an endorsement key, an attestation identity key (AIK), a storage root key, an encryption key, a signing key, and an endorsement credential key.

6. The method of claim 3, wherein the nonvolatile memory and boot-software are part of an extensible firmware interface (EFI) framework.

7. The method of claim 1, wherein the stand-alone TPM emulator handles commands issued to a TPM memory space.

8. A storage device including program code which, when executed by a machine, causes the machine to perform the operations of:
initializing a machine state register (MSR) to generate a system management interrupt (SMI) in response to a secure instruction event; and
emulating a stand-alone trusted platform module (TPM) in a protected range of system memory in response to generating the SMI, wherein the protected range of memory is at least partially overlapping with a range of memory associated with a virtual monitor, the virtual monitor being selected from a group consisting of a system management monitor (SMM), a SMI transfer monitor (STM), and a virtual machine monitor (VMM).

9. The storage device of claim 8, further comprises:
allowing the SMI to be generated during a secure launch of the machine.

10. The storage device of claim 8, wherein the secure instruction is a secure-enter (SENTER) instruction.

11. The storage device of claim 8, wherein the secure instruction is a secure initialization instruction.

12. The storage device of claim 8, wherein emulating the stand-alone TPM in the protected range of system memory comprises:
emulating a TPM structure in the protected range of system memory, the TPM structure being selected from a group consisting of, a user key hierarchy, a platform configuration register (PCR), a monotonic counter, a data integrity register, an endorsement key, an attestation identity key (AIK), a storage root key, an encryption key, a signing key, and an endorsement credential key.

13. A system comprising:
a nonvolatile memory to store boot-code, the nonvolatile memory having a secure portion to store cryptographic information;
a system memory to include a range of memory associated with a virtual monitor, the range of memory further to hold stand-alone trusted platform module (TPM) emulator code to perform cryptographic operations on at least the cryptographic information; and
a controller hub coupled to the nonvolatile memory, the system memory, and a microprocessor, wherein the microprocessor is adapted to operate in a virtual monitor mode to execute the stand-alone TPM emulator code from the protected range of memory, wherein the microprocessor is also to issue a TPM ordinal, wherein the TPM ordinal references the range of memory associated with the stand-alone trusted platform module (TPM) emulator code.

14. The system of claim 13, wherein the cryptographic information is selected from a group consisting of a platform configuration value, a private key, a public key, an endorsement key, an attestation identity key (AIK), a storage root key, an encryption key, a signing key, and an endorsement credential key.

15. The system of claim 13, wherein
the cryptographic information includes a first hash value based on a previous system configuration, and wherein
the cryptographic operations include
determining a second hash value, upon booting the system, based upon a current system configuration, and comparing the first and second hash values to determine if the system configurations match.

16. The system of claim 13, wherein the cryptographic operations are selected from a group consisting of data protection, hashing, sealing an internally generate asymmetric key pair to a particular computing platform, signing information with a private key, and signing information with a public key.

17. The system of claim 13, wherein upon detecting the issue of the TPM ordinal, the microprocessor is to execute the stand-alone TPM emulator code to handle the TPM ordinal.

18. The system of claim 13, wherein the virtual monitor is selected from a group consisting of a system management monitor (SMM), a SMI transfer monitor (STM), and a virtual machine monitor (VMM).

* * * * *